Feb. 3, 1925. 1,524,961
O. ASCHE
PORTABLE COOKING APPLIANCE
Filed April 2, 1924   2 Sheets-Sheet 2

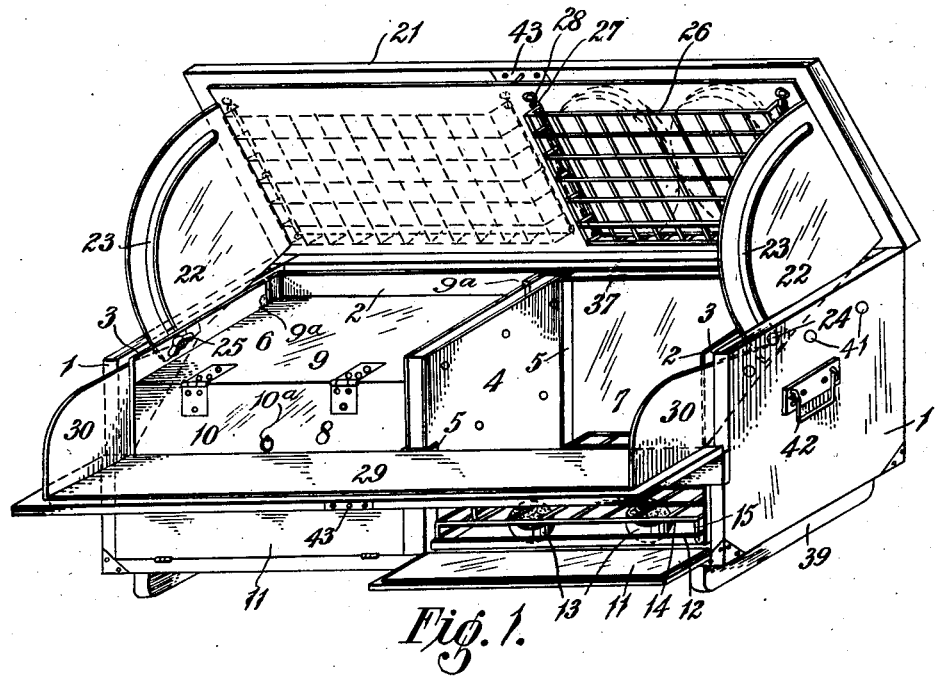

INVENTOR:
OSCAR ASCHE,
By John O. Seifert
Atty.

Patented Feb. 3, 1925.

1,524,961

UNITED STATES PATENT OFFICE.

OSCAR ASCHE, OF DARLINGHURST, NEAR SYDNEY, NEW SOUTH WALES, AUSTRALIA.

PORTABLE COOKING APPLIANCE.

Application filed April 2, 1924. Serial No. 703,714.

*To all whom it may concern:*

Be it known that I, OSCAR ASCHE, a subject of the King of Great Britain, residing at No. 202 New Hampton Court, Darlinghurst, near Sydney, in the State of New South Wales, Commonwealth of Australia, have invented new and useful Improvements in and Relating to Portable Cooking Appliances, of which the following is a specification.

This invention relates to improvements in and connected with portable cooking apparatus. More particularly, it relates to a portable combination apparatus having means whereby comestibles can be stored and kept in cool condition, and means whereby hot meals can be prepared conveniently and economically.

An object of the invention is to provide a portable dual purpose apparatus of durable and compact construction, primarily for outdoor use by motorists, picnickers, campers and others, but also adapted for installation in residences and in flats where it can be used with equal advantage for the ready and convenient preparation of hot meals, while providing facilities to store and maintain comestibles in cool condition.

A further object of the invention is to provide a portable cooking apparatus having adjustably movable parts, which function as wind deflecting shields, and of such general construction as will permit cooking operations, using a fuel such as methylated spirits, to be performed satisfactorily, economically and with an entire absence of danger, notwithstanding that the apparatus may be in the open air and the weather windy or stormy.

The combination apparatus comprises a cabinet lined with light metal, such as aluminum, and having a surrounding air passage. A lid hingedly secured to the casing has end sector plates which serve as wind deflectors, and it is furnished on its interior surface with one or more basket or rack devices to accommodate crockeryware or utensils. This lid can be locked at a required elevation by appropriate retaining devices.

Extending across the full length of the cabinet at its forward end is a hinged flap having suitable end members and adapted to be infolded for closure purposes and down-folded to serve as a shelf to support vessels or utensils that are in use. Immediately beneath said hinged flaps there are two doors, each of which is hinged to the cabinet at its lower end and is adapted to be downwardly folded to provide an additional shelf or support.

The cabinet is divided by a vertical removable partition into a cooling chamber and a cooker section. Positioned within the cooling chamber is an ice-chest having a hinged cover and a hinged front flap, thus permitting comestibles to be conveniently inserted and withdrawn.

The cooker section is equipped with a metal tray, on which fuel burners are supported: a broiling grid of novel construction: and a grid frame to support cooking utensils at a required height above the fuel burners.

In order that the invention and its manner of performance may be clearly understood, reference is made to the accompanying drawings wherein:—

Figure 1 is a perspective view of the improved combination apparatus having its integers arranged for the cooking of comestibles.

Figure 2 is a view in plan of the apparatus, with the hinged cover removed and showing the front flap in its opened position.

Figure 7 is a detail sectional view illustrating a method of wall insulation for the cabinet.

Figure 8 is a detail sectional view in plan showing the slidably detachable partitioning wall of the cabinet.

Figures 6, 7 and 8 are drawn to a larger scale than the remaining figures.

Figure 4:
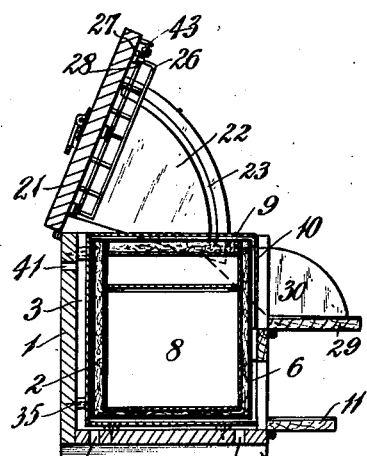
Figure 4 is a vertical section on the line 2—2 of Figure 2.

In these views, wherein like characters of reference indicate the same or similar parts, 1 designates a rectangular-shaped cabinet, which is preferably constructed of wood and dimensioned to fit upon, and be supported by, the running board of an automobile. A lining 2 of light metal, such as aluminum, is fitted in the cabinet and is distanced therefrom to provide a jacketed space 3 for the free circulation of atmospheric air around the bottom, the rear wall and the two side walls of said jacket.

The cabinet has a vertical partitioning wall 4 of hollow or tubular formation, which is removable by being vertically slidable in channelled guides 5. This partitioning wall may be filled with asbestos or similar heat resisting and heat insulating material. It divides the cabinet into two compartments 6 and 7—one being utilized as a cooling chamber and the other as a cooker section.

Accommodated within the chamber 6 is an ice-chest 8 furnished with a detachable cover. This cover consists of two hingedly connected sections 9 and 10. The cover section 9 is hingedly but detachably fitted by having pintles accommodated in slots 9ª formed in the lining 2 and in the partitioning wall 4, while the cover section 10 is furnished with a ring or like finger-piece 10ª. The two hingedly connected sections of the cover can be elevated and lowered as an unit, and the flap 10 may be raised and lowered as an independent integer, thereby facilitating the insertion and the removal of articles of varying sizes into and from said ice-chest.

Each of the compartments 6 and 7 has at its front end a door 11 that is hinged to the bottom of said cabinet, and is adapted to be downwardly folded to provide a shelf to support articles used with the apparatus. When upward closing movement is imparted to said doors, they are automatically locked by the use of appropriate spring latching devices of well-known character.

Fitted in the cooker section or compartment 7 of the cabinet is a metal tray 12 that supports a series of fuel burners 13. When the door 11 of this compartment of the apparatus is down-folded, it functions as a supporting ledge, enabling said tray and the burners supported thereon to be conveniently inserted into the compartment and withdrawn therefrom, when occasion requires.

The fuel burners 13 are preferably in the form of cylindrical containers, in each of which is packed cotton or like fibrous material that has been saturated with inflammable liquid fuel such as methylated spirits. Other forms of fuel burners, that are well-known, may be used, or, if desired, wood may be utilized as the fuel, but for convenience I prefer to use burners of the type mentioned and frequently referred to as "canned-heat". The cylindrical containers of the spirit-saturated fibre may be provided with covers adapted to be readily detached preparatory to cooking operations.

A grid 14, preferably constructed in the form of a wire frame having legs 15 fits within the cooker section 7 of the cabinet 1. This grid having its legs resting on the tray 12 supports cooking utensils at an approved height above the burners 13. The cooking utensils are not illustrated, but I prefer to employ aluminium vessels of varying sizes, which are nested together for compactness after use.

Figure 6:
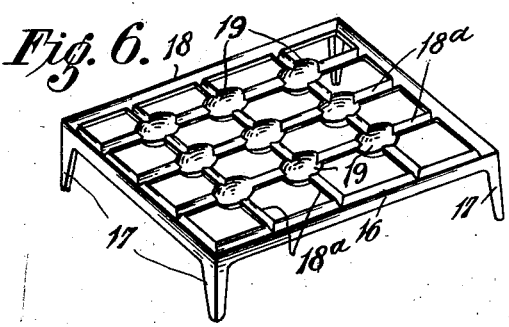
Figure 6 is a perspective view of a broiling grid adapted to be detachably fitted into the cooker section of the apparatus.

For broiling meats, a grid 16 as is illustrated in Figure 6 of the drawings, is employed in lieu of the grid 14.

Figure 5:
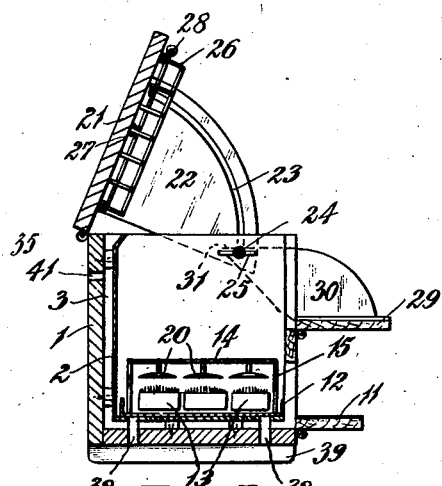
Figure 5 is a vertical section on the lines 3—3 of Figure 2.
Figure 3:
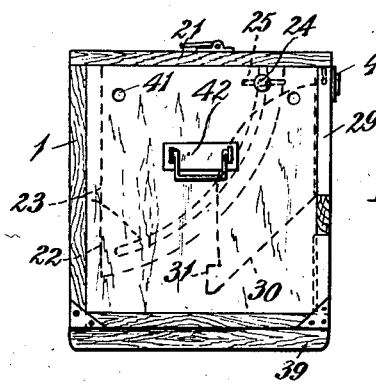
Figure 3 is a view in end elevation of the apparatus having its foldable integers closed.

This broiling grid is of square or rectangular configuration having supporting legs 17 to rest upon the tray 12 when the appliance is inserted within the cooking compartment 7. The marginal bars 18 and the grid bars 18ª arranged in inter-secting lines are substantially of V-shape in cross-section and communicate with the parallel rows of concaved catchments 19. As a result of the inter-communication existing between the grid bars and the catchments, juices exuded from meats being broiled are collected in said grid bars and delivered to the catchments. The grid-bars 18—18ª and the concaved catchments 19 act as heat deflectors, thereby ensuring an evenness of heat distribution and tending to economy of fuel consumption. If desired, additional heat deflecting elements, such as are indicated by 20 in Figure 5, can be detachably fitted to the broiling grid in desired positions relatively to the fuel burners 13.

The cabinet 1 has a lid 21 that is hingedly secured to its rear wall. Affixed to the underside of the said cover at its opposite ends are sector plates 22 that are positioned so as to be accommodated in the air space 3, when said lid is closed. Formed in said sector plates are radius slots 23. Bolts 24 are passed through holes formed in the end walls of the cabinet, and extend through said slots, their inner ends being fitted with wing-nuts 25. These wing-nuts, when tightened, bear against the lining 2 and cause it to frictionally engage the sector plates 22, whereby the hinged lid 21 is securely retained in elevated position. By easing the wing-nuts 25, the lid 21 may be either lowered or raised on hinges, when the nuts are again tightened against the lining 2, thereby immovably securing said cover in a selected adjusted position. Moreover, said sector plates function as wind deflectors or shields and aid in the obtainment of satisfactory cooking results under open air conditions.

A wire basket 26 having loops 27 is detachably secured to the interior surface of the hinged lid 21, by rods passing through screw eyes 28 fastened to said lid. This basket is designed to accommodate plates or like articles desired to be warmed prior to the serving of a meal, or alternatively it can be readily detached from said hinged lid by removal of said rods and placed upon the grid within the cooker compartment 7 and utilized for toasting or like purposes.

The passage of heated air, through the cooker compartment 7, quickly warms the plates held by the basket, and if necessary, the lid 21 can be suitably adjusted for the purpose. An additional wire basket may be secured to the interior surface of the hinged lid 21 at its opposite end, as is indicated by the broken lines in Figure 1.

A hinged flap 29 is connected to the cabinet 1 at its forward end. Said flap is positioned above the two doors 11, and it extends the full length of the cabinet to provide a closure for the upper end portions of the compartments 6 and 7 and, when downwardly folded to the horizontal, to serve as a shelf to support, at a convenient elevation, articles or utensils used in cooking or for the serving of meals.

Affixed to the upper surface of the flap 29 are end plates 30 adapted to be accommodated within the air space 3 between the cabinet end walls and the lining 2, when said flap is closed. Said end plates 30 serve as wind-shields similarly to the sector plates 22, and they are appropriately curved at their outer ends. The upper edges of said end plates 30 are fashioned to provide ramps having slidable engagement with the bolts 24 that pass through the radius slots 23 in the sector plates 22 of the cover 21.

Formed at the inner ends of the ramp portions of the end plates 30 are lugs 31 adapted to contact with said bolts 34, and in this respect they function as limit stops by preventing any downward movement of the hinged flap 29 beyond the horizontal. Said flap 29 can be locked in adjusted elevated position by tightening the wing-nuts 25 against the metal lining 2 so as to cause it to frictionally engage the end plates 30 in the same manner as the sector plates 22 of the lid 21 are engaged.

The rear wall of the cooker compartment 7 is preferably constructed of two metallic plates 32 and 33 with a packing 34 of asbestos or like insulating material—see Figure 7. This heat resisting wall is secured to the cabinet 1 at an approved distance from its interior surface by the use of distance pieces 35 formed of cork or other light material and screws 36 that are passed through said wall and the distance pieces into the rear wall of the cabinet.

The upper ends of the plates 32 and 33 of the heat resisting wall secured in the rear end of the cabinet 1 are flanged upwardly and inwardly to provide a baffle 37 which prevents the heat fumes ascending through the cooking chamber from impinging directly against the woodwork of the hinged lid 21.

The metal lining 2 is secured to the cabinet 1 by the use of washers 35 of cork or like material and screws 36 (similar to those hereinbefore described) to form the jacketed air space 3, and to provide facilities for the removal of said lining as an unit from the cabinet for cleaning or other purposes.

Small tubes 38 are secured to the metal lining 2 and pass through the bottom of the cooker compartment 7 to permit the discharge of flushing water or liquid that may overflow from the cooking utensils within said compartment. Cleats 39 are affixed to the underside of said cabinet to support it at a suitable distance above the ground level and enable the tubes 38 to function also as ducts for the admission of air streams to the fuel burners 13. The cleats 39 also provide a passage for the inlet of air through ports 40 in the bottom of the cabinet 1 into the jacketed space 3. The air circulates freely through the jacketed space around the cooling and cooker compartments 6 and 7, respectively, and escapes through ports 41 that are formed in the rear and two end walls of the cabinet 1.

Handles 42 fastened to the ends of the cabinet permit the combination apparatus to be conveniently carried from one situation to another, and locks 43 of the automatic snap type are provided to lock the hinged lid 21 and flap 29 when closed together.

The partitioning wall 4 and the ice-chest 8 with its covers 9 and 10 may be removed from the cabinet 1 to provide a cooker compartment that extends the full length of said cabinet. Under these circumstances, the additional wire basket 26 would be of service for plate warming, while a tray 12, burners 13 and a grid 14 or 16 are inserted in the left-hand side of the cabinet in lieu of the detached ice chest.

A preferred construction has been herein described, but I wish it to be understood that modifications in construction, design and arrangement of the integers of the improved apparatus may be made within the ambit of the invention as defined by the following claiming clauses.

What I do claim is:—

1. A portable combination cooking apparatus comprising a cabinet, a partitioning wall in said cabinet dividing it into two compartments, an ice chest in one of said compartments, fuel burners and grid bars in the other of said compartments, an adjustable lid on said cabinet covering both of said compartments, a hinged flap at the front of said cabinet, and end plates on said lid and said flap acting as wind-shields, substantially as described.

2. A portable combination cooking apparatus according to claim 1, wherein the cabinet has a metallic lining and tubes are fitted to said lining and pass through the bottom of the cabinet, substantially as described.

3. A portable combination cooking apparatus, according to claim 1, wherein cleats are fastened to the underneath surface of the cabinet, and air holes are formed in the bottom and in the vertical walls of the cabinet, substantially as described.

4. A portable combination cooking apparatus, comprising a cabinet, a jacketed air space around said cabinet, a partitioning wall in said cabinet dividing it into two compartments, an ice chest in one of said compartments, fuel burners and grid bars in the other of said compartments, a cover on said cabinet, sector plates affixed to the ends of said lid and accommodated in the jacketed air space around the cabinet when said lid is closed, slots in said sector plates, and bolts passed through said slots and fitted with nuts to retain said lid in adjusted position, substantially as described.

5. A portable combination cooking apparatus comprising a cabinet, a partitioning wall in said cabinet dividing it into two compartments, an ice chest in one compartment, fuel burners and grid bars in the other of said compartments, a lid on said cabinet, a hinged flap at the front of said cabinet, and functioning as a shelf when downwardly folded, end plates affixed to said flap and accommodated in the jacketed air space around the cabinet, bolts passed through said cabinet and fitted with wing-nuts retaining said hinged flap in adjusted position, and stops on said end plates adapted to contact with said bolts and limit the downward movement of said hinged flap, substantially as described.

In testimony whereof I affix my signature in presence of two witnesses.

OSCAR ASCHE.

Witnesses:
M. STARFELD,
B. BOULTON.